(12) United States Patent
Kamiyama et al.

(10) Patent No.: US 10,131,190 B2
(45) Date of Patent: Nov. 20, 2018

(54) VEHICLE WHEEL HAVING SOUND-DAMPING STRUCTURES

(71) Applicant: HONDA MOTOR CO., LTD., Minato-ku, Tokyo (JP)

(72) Inventors: Youichi Kamiyama, Wako (JP); Katsushi Ishii, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 33 days.

(21) Appl. No.: 15/125,517

(22) PCT Filed: Mar. 11, 2015

(86) PCT No.: PCT/JP2015/057081
§ 371 (c)(1),
(2) Date: Sep. 12, 2016

(87) PCT Pub. No.: WO2015/137368
PCT Pub. Date: Sep. 17, 2015

(65) Prior Publication Data
US 2017/0096028 A1    Apr. 6, 2017

(30) Foreign Application Priority Data

Mar. 13, 2014 (JP) .................................. 2014-050711

(51) Int. Cl.
*B60C 19/00* (2006.01)
*B60B 21/12* (2006.01)
*B60B 21/02* (2006.01)

(52) U.S. Cl.
CPC .......... *B60C 19/002* (2013.01); *B60B 21/026* (2013.01); *B60B 21/12* (2013.01);
(Continued)

(58) Field of Classification Search
CPC ....... B60B 21/12; B60C 19/002; B60C 17/04; B60C 17/041
See application file for complete search history.

(56) References Cited

U.S. PATENT DOCUMENTS 7,690,410 B2    4/2010   Kamiyama et al.
7,896,043 B2 *  3/2011   Kashiwai ............ B60C 23/0494
                                                      152/381.6
(Continued)

FOREIGN PATENT DOCUMENTS

CN    1750943 A       3/2006
JP    2006-298231 A   11/2006
(Continued)

OTHER PUBLICATIONS

Japanese Office Action dated Jun. 25, 2017 in the corresponding Japanese patent application 2016-507772 with the English translation thereof.

(Continued)

*Primary Examiner* — Jason R Bellinger
(74) *Attorney, Agent, or Firm* — Carrier Blackman & Associates, P.C.; William D. Blackman; Joseph P. Carrier

(57) ABSTRACT

This vehicle wheel includes: a first vertical wall surface defined by one rising part of a rim that forms a well part and a second vertical wall surface defined by another rising part are provided; an auxiliary air chamber member has a main body part with an auxiliary air chamber on the inside and has edge parts extending from each of both sides of the main body part in the wheel width direction; each of the edge parts of the auxiliary air chamber member fits into a groove formed in each of the first vertical wall surface and second vertical wall surface, and the auxiliary air chamber member is thereby attached atop the outer circumferential surface of the well part.

4 Claims, 6 Drawing Sheets

(52) U.S. Cl.
CPC ......... *B60B 21/02* (2013.01); *B60B 2900/131* (2013.01); *B60B 2900/133* (2013.01)

(56) References Cited

U.S. PATENT DOCUMENTS

| | | | |
|---|---|---|---|
| 7,896,044 B2* | 3/2011 | Kashiwai | B60B 3/04 |
| | | | 152/381.6 |
| 8,286,679 B2* | 10/2012 | Kamiyama | B60B 1/08 |
| | | | 152/381.6 |
| 9,694,626 B2* | 7/2017 | Kamiyama | B60B 21/12 |
| 2006/0124216 A1 | 6/2006 | Naito et al. | |
| 2011/0057505 A1 | 3/2011 | Nagata et al. | |

FOREIGN PATENT DOCUMENTS

| | | |
|---|---|---|
| JP | 4551422 B2 | 9/2010 |
| JP | 2011-057006 A | 3/2011 |
| JP | 2012-016973 A | 1/2012 |
| JP | 20120045971 A | 3/2012 |
| JP | 2013-107599 A | 6/2013 |
| JP | 2015-171876 A | 10/2015 |

OTHER PUBLICATIONS

Chinese Office Action dated Jun. 27, 2017 in the corresponding CN Patent Application No. 201580013096.8 with the English translation thereof.
Japanese Office Action dated Feb. 7, 2017 in the corresponding JP Patent Application 2016-507772 with the English translation thereof.
Japanese Office Action dated Jun. 26, 2018 in the corresponding JP Patent Application 2017-206049 with the English translation thereof.

* cited by examiner

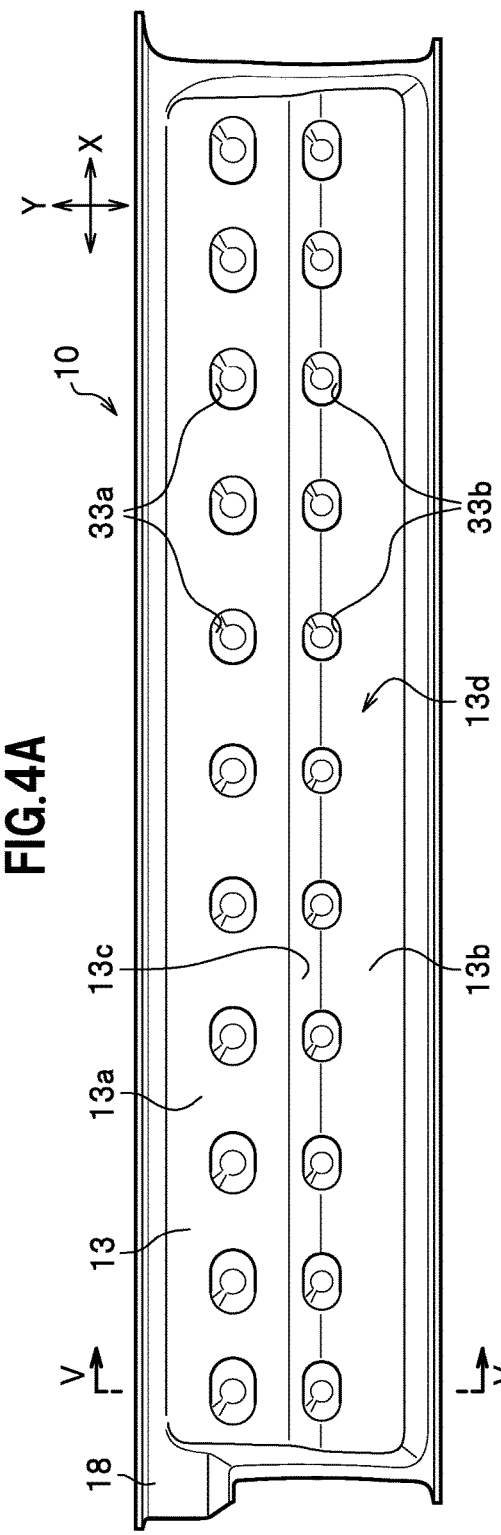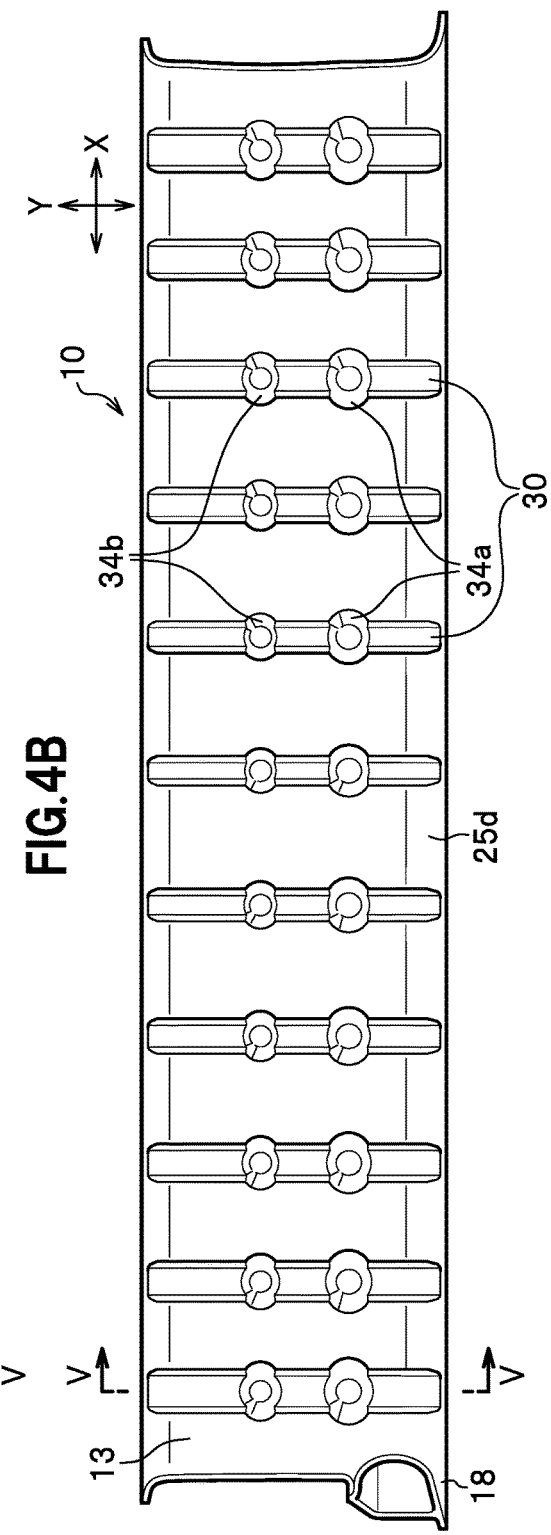

VEHICLE WHEEL HAVING SOUND-DAMPING STRUCTURES

TECHNICAL FIELD

The present invention relates to a vehicle wheel.

BACKGROUND ART

Conventionally, as a wheel that silences air column resonance sound in the air chamber of a tire, there is known a type having sub air chamber members that are attached to the outer circumferential surface of a well portion and function as a Helmholtz resonator in an air chamber of a tire (as an example, refer to Patent Document 1).

This wheel has a vertical wall standing on this outer circumferential surface such as to be along the circumferential direction of the outer circumferential surface of the well portion, a first vertical wall surface restricted by this vertical wall, and a second vertical wall surface restricted by one of standing-up portions of the well portion, the second vertical wall surface facing the first vertical wall surface. A sub air chamber member is attached to the outer circumferential surface of the well portion by being inserted between the first vertical wall surface and the second vertical wall surface.

RELATED ART DOCUMENT

Patent Document

Patent Document 1: Japanese Patent No. 4551422

DISCLOSURE OF THE INVENTION

Problems to be Solved by the Invention

However, for a conventional wheel (as an example, refer to Patent Document 1), in order to attach a sub air chamber member as a Helmholtz resonator, it is necessary to provide the above-described vertical wall on the outer circumferential surface of the well portion. This causes a problem of making a rim structure complicated.

Further, in order that the Helmholtz resonator exerts enough silencing effect, it is desirable to secure a large volume of the sub air chamber provided to the sub air chamber member.

However, as a sub air chamber member of a conventional wheel (for example, refer to Patent Document 1) is disposed between the above-described vertical wall and the standing-up portion of the well portion, there is a problem that the volume of the sub air chamber is limited to the volume pf the space between the vertical wall and the standing-up portion.

In this situation, an object of the present invention is to provide a vehicle wheel to which attached are sub air chamber members with a volume of the sub air chamber larger than that of a conventional one, by a structure simpler than a conventional one.

Means for Solving the Problems

According to the present invention having solved the above-described problem, a vehicle wheel in which sub air chamber members as Helmholtz resonators are attached to an outer circumferential surface of a well portion includes: a first vertical wall surface restricted by one of standing-up portions of a rim forming the well portion; and a second vertical wall surface restricted by the other one of the standing-up portions of the rim forming the well portion, wherein the each sub air chamber member includes: a main body portion having a sub air chamber member inside; and fringe portions extending from respective ones of both sides, in wheel width direction, of the main body portion, wherein the fringe portions of the sub air chamber member are respectively fitted into groove portions formed respectively on the first vertical wall surface and the second vertical wall surface so that the sub air chamber member is attached to the outer circumferential surface of the well portion.

For this vehicle wheel, as the each sub air chamber member is attached to the standing-up portions of the rim forming the well portion, it is unnecessary to provide a standing vertical wall to the outer circumferential surface of the well portion, which makes a difference from a conventional vehicle wheel (for example, refer to Patent Document 1). Accordingly, a vehicle wheel according to the present invention has a simple structure in which a vertical wall is omitted.

Further, by omitting the vertical wall, this vehicle wheel ensures the disposition space of a sub air chamber member on the outer circumferential surface of the well portion to be larger compared with a conventional vehicle wheel (for example, refer to Patent Document 1). Accordingly, by a vehicle wheel according to the present invention, a sub air chamber (main body portion) can be made large.

Further, in this vehicle wheel, the main body portion of the above-described sub air chamber member has a recessed portion into which the beads of a tire are dropped in attaching the tire to a part of the region on the outer side in the wheel radial direction.

By this vehicle wheel, while maintaining the easiness of attaching the tire, the sub air chamber formed on a sub air chamber (main body portion) can be made large.

Advantages of the Invention

According to the present invention, it is possible to provide a vehicle wheel to which attached are sub air chamber members with a larger volume of a sub air chamber than that of a conventional one, by a structure simpler than a conventional one.

BRIEF DESCRIPTION OF THE DRAWINGS

FIG. 4A is a top view of the sub air chamber member in FIG. 3, in a view from the outer side along the wheel radial direction, and FIG. 4B is a bottom view of the sub air chamber member in FIG. 3, in a view from the inner side along the wheel radial direction;

EMBODIMENT FOR CARRYING OUT THE INVENTION

Figure 1:
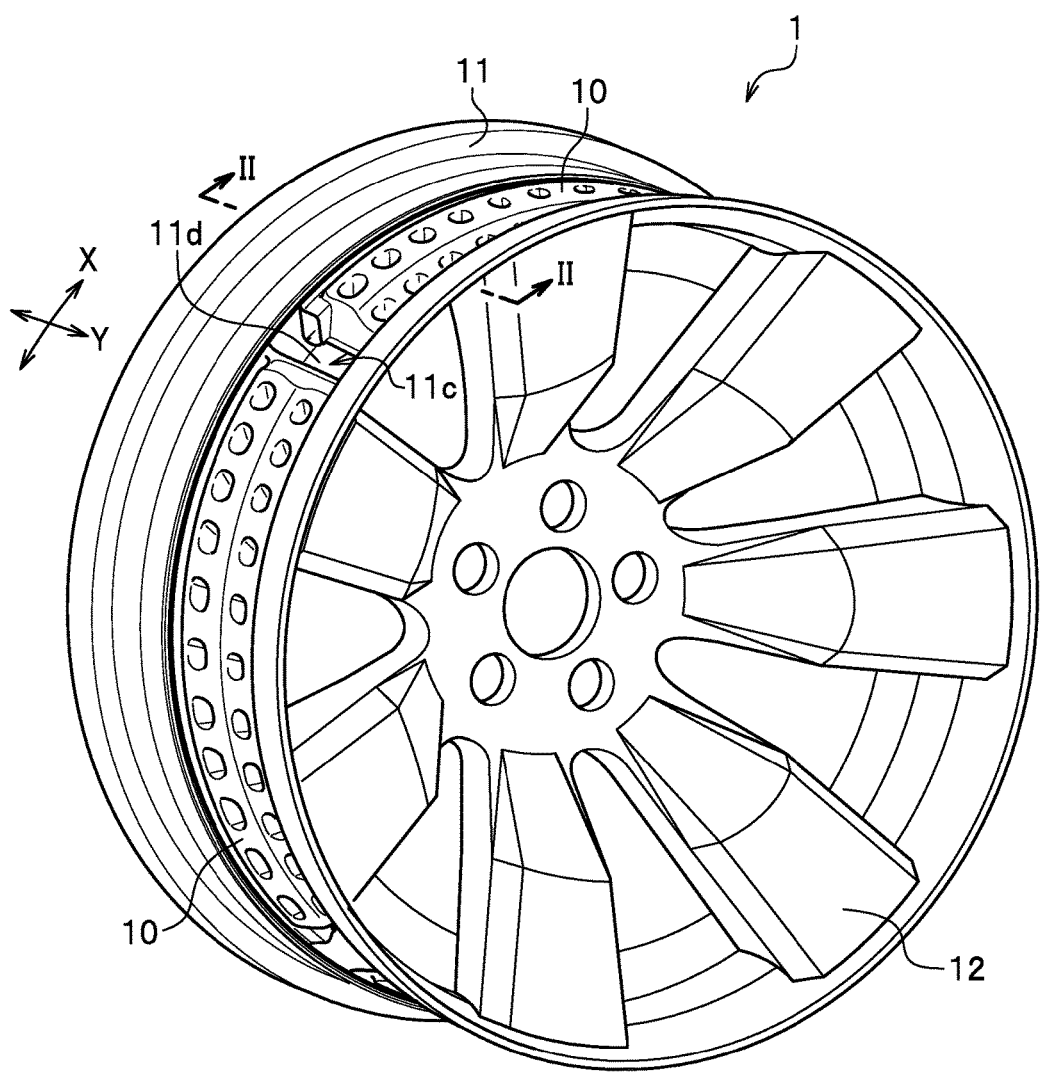
FIG. 1 is a perspective view of a vehicle wheel according to an embodiment of the present invention.

An embodiment according to the present invention will be described below in detail, referring to the drawings, as appropriate.

FIG. 1 is a perspective view of a vehicle wheel 1 according to an embodiment of the present invention.

As shown in FIG. 1, the vehicle wheel 1 in the present embodiment has a plurality of sub air chamber members 10 as Helmholtz resonators along the wheel circumferential direction X at equal intervals. Incidentally, in the present embodiment, a vehicle wheel having four sub air chamber members 10 is assumed.

The vehicle wheel 1 in the present embodiment is provided with a rim 11 and a disc 12 for connecting this rim 11 to a hub (not shown). The sub air chamber members 10 are inserted on the outer circumferential surface 11d of the well portion 11c of the rim 11 and thus fitted.

<Rim>

First, the rim 11 to which the sub air chamber members 10 are attached will be described.

Figure 2:
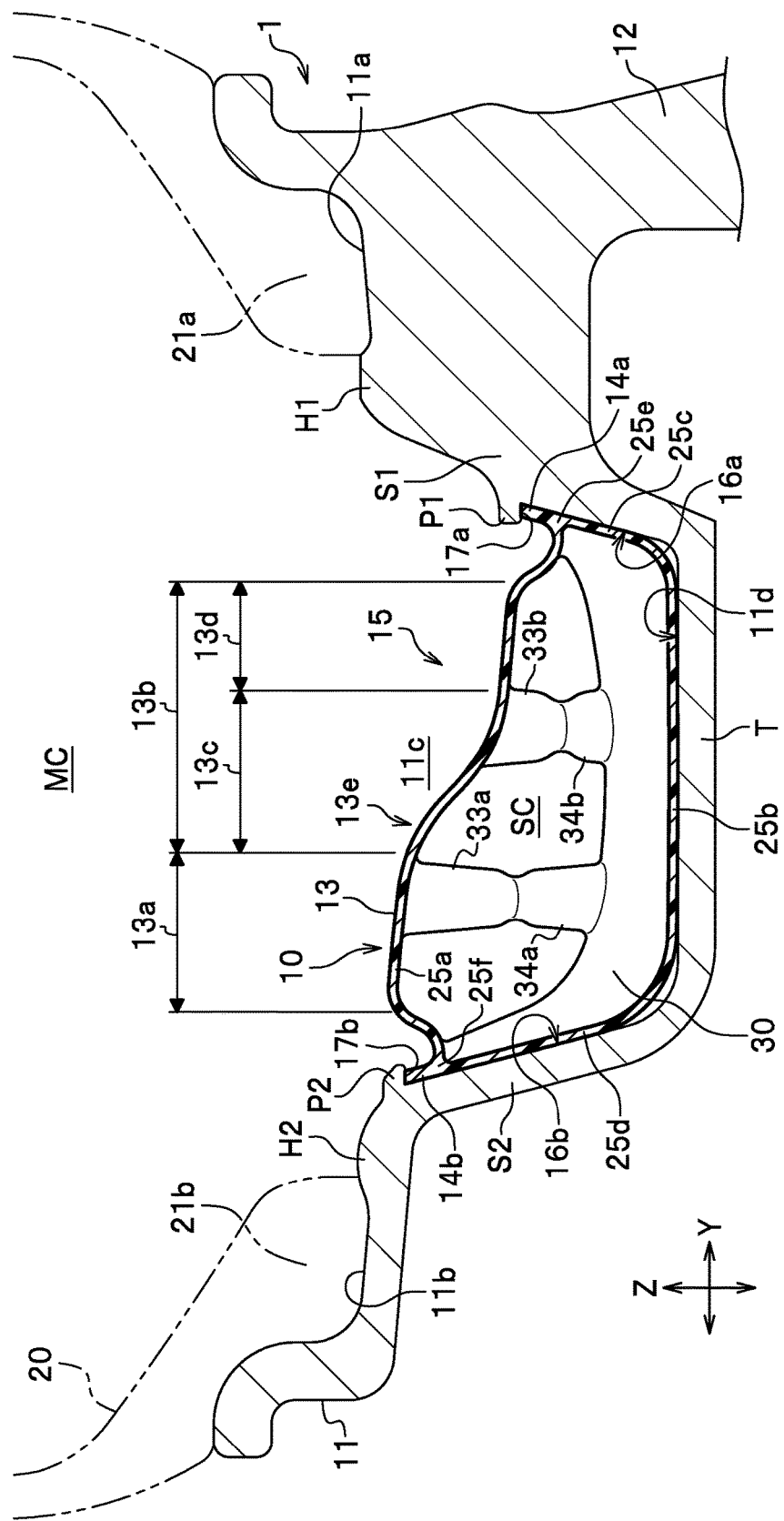
FIG. 2 is a partial enlarged cross-sectional view of the cross-section taken along II-II in FIG. 1.

FIG. 2 is a partial enlarged cross-sectional view of the cross-section taken along II-II in FIG. 1. In FIG. 2, a vicinity of the beads 21a, 21b of a tire 20 attached to the rim 11 is drawn partially by a virtual curve (alternate long and two short dashes curve).

As shown in FIG. 2, the rim 11 has the well portion 11c recessed between bead sheets 11a, 11b formed at the both ends, in the wheel width direction Y, of the rim 11, the recession being toward the inner side (the lower side of the paper sheet of FIG. 2) along the wheel radial direction Z.

The well portion 11c in the present embodiment has a body portion T and a pair of standing-up portions S1, S2 facing each other in wheel width direction Y with the body portion T in between.

The body portion T is in a cylindrical shape with a diameter almost constant along the wheel width direction Y.

The standing-up portions S1, S2 are formed such as to stand up from the surface of the body portion T, namely the outer circumferential surface 11d of the well portion 11c, toward the outer side (the upper side of the paper sheet of FIG. 2) in wheel radial direction Z.

The standing-up portion S1 restricts the first vertical wall surface 16a between the end portion of the outer circumferential surface 11d and a hump portion H1. The first vertical wall surface 16a is inclined upward from the end portion of the outer circumferential surface 11d to the hump portion H1 in a view taking the outer side in the wheel radial direction Z upward. The standing-up portion S2 restricts the second vertical wall surface 16b between the end portion of the outer circumferential surface 11d and a hump portion H2. The second vertical wall surface 16b is inclined upward from the end portion of the outer circumferential surface 11d to the hump portion H2 in a view taking the outer side in the wheel radial direction Z upward.

The first vertical wall surface 16a has a protruding portion P1 protruding substantially from the midpoint between the end portion of the outer circumferential surface 11d and the hump portion H1, toward the inner side, in the wheel width direction Y, of the wheel. This protruding portion P1 extends on the first vertical wall surface 16a along the wheel circumferential direction X (see FIG. 1) and forms an annular shape with the wheel rotation axis (not shown) as the center.

The protruding portion P1 and the first vertical wall surface 16a form a first groove portion 17a in collaboration. Concretely, the groove portion 17a is formed on the inner side, in the wheel radial direction Z, of the protruding portion P1 and between the protruding portion P1 and the first vertical wall surface 16a, in other words, formed at the edge portion formed by the protruding portion P1 and the first vertical wall surface 16a. The tip end of the fringe portion 14a of the sub air chamber member 10 is in contact with the groove portion 17a, such as to be pressed against the groove portion 17a, and thus is fitted in. The groove portion 17a is formed along the wheel circumferential direction X (see FIG. 1) on the first vertical wall surface 16a.

The second vertical wall surface 16b is provided with a protruding portion P2 adjacent to a hump portion H2. The protruding portion P2 is formed such as to protrude to the inner side in the wheel width direction Y, extends in the wheel circumferential direction X (see FIG. 1) on the second vertical wall surface 16b, and forms an annular shape with the rotation axis (not shown) as the center.

The protruding portion P2 and the second vertical wall surface 16b form a second groove portion 17b in collaboration. Concretely, the groove portion 17b is formed on the inner side, in the wheel radial direction Z, of the protruding portion P2 and between the protruding portion P2 and the first vertical wall surface 16b, in other words, formed at the edge portion formed by the protruding portion P2 and the second vertical wall surface 16b. The tip end of the fringe portion 14b of the sub air chamber member 10 is in contact with the groove portion 17b such as to be pressed against the groove portion 17b, and thus is fitted in. The groove portion 17b is formed along the wheel circumferential direction X (see FIG. 1) on the second vertical wall surface 16b.

Incidentally, in FIG. 2, symbol MC represents a tire air chamber. Symbol 13 represents the main body portion of the sub air chamber member 10 described below; symbol 13a represents a first region of the main body portion 13; symbol 13b represents a second region of the main body portion 13; symbol 13c represents a connecting region of the main body portion 13; symbol 13d represents a sleeve region of the main body portion 13; and symbol 13e represents a boundary between the connecting region 13c and the first region 13a. Symbol 25a represents a top plate constructing the main body portion 13; symbol 25b represents a bottom plate constructing the main body portion 13; and symbols 25c and 25d represent side plates constructing the main body portion 13. Further, symbols 25e and 25f represent joint portions between the top plate 25a and the side plates 25c, 25d. Symbol 15 represents a recessed portion formed on the main body portion 13; symbol 30 represents a bead; symbols 33a, 33b represent upper joining portions; symbol 34a, 34b represent lower joining portions; and symbol SC represents a sub air chamber.

<Sub Air Chamber Member>

Figure 3:
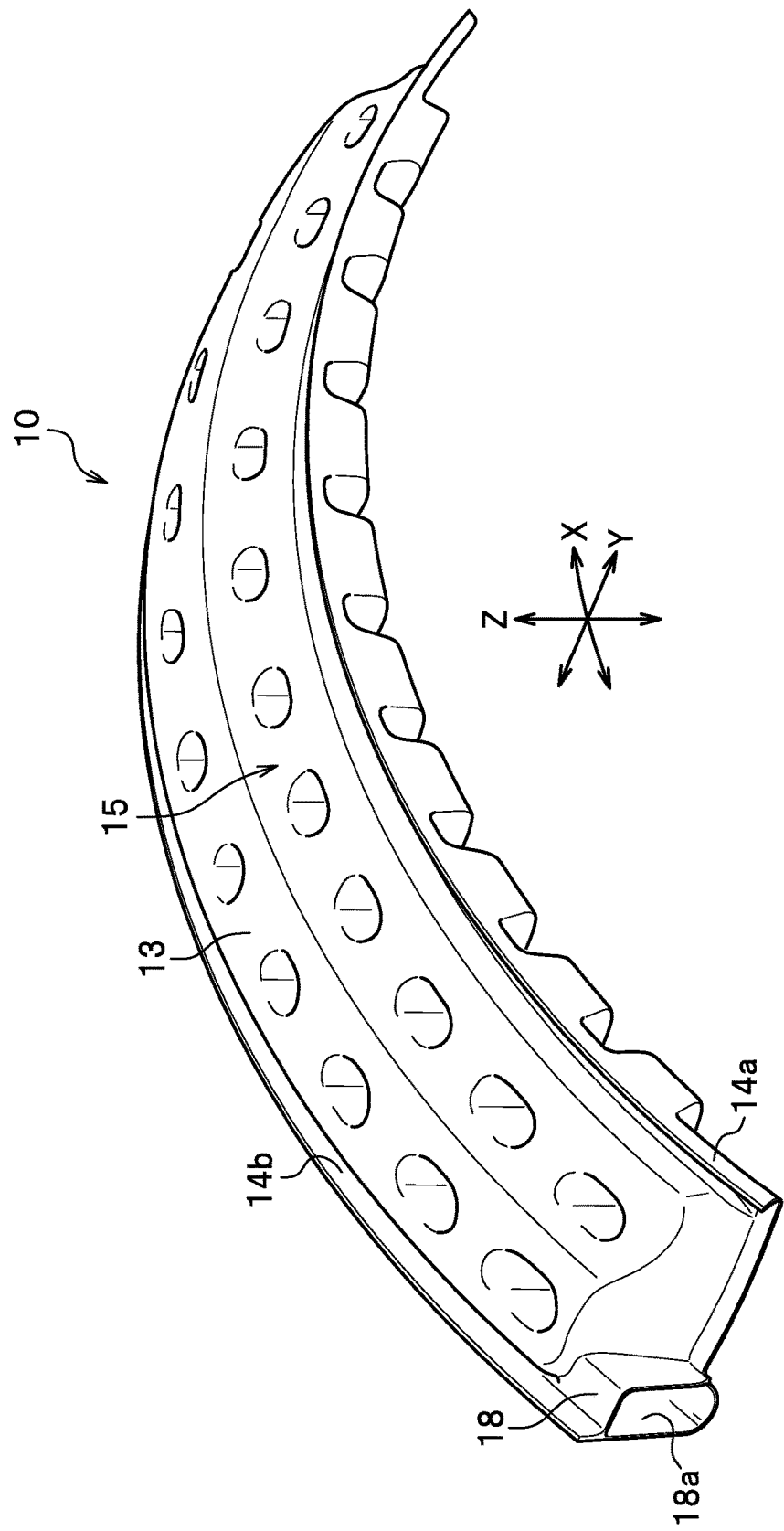
FIG. 3 is an entire perspective view of a sub air chamber member.

FIG. 3 is an entire perspective view of a sub air chamber member 10. In FIG. 3, symbol X represents the wheel circumferential direction in a state that this sub air chamber member 10 is attached to the well portion 11c (see FIG. 1) of the rim 11 (see FIG. 1), and symbol Y represents wheel width direction.

As shown in FIG. 3, the sub air chamber member 10 is a member longitudinal in the wheel circumferential direction X, provided with the main body portion 13, a tube body 18, and fringe portions 14a, 14b.

(Main Body)

The main body portion 13 is formed longitudinal in the circumferential direction of the outer circumferential surface 11d (see FIG. 1) such as to curve, matching with the curvature along the circumferential direction.

In FIG. 3, symbol 15 represents a recessed portion described in the following.

Returning to FIG. 2, the recessed portion 15 is formed by recessing a region of a part of the outer side (the upper side of the paper sheet of FIG. 2) in the wheel radial direction Z of the main body portion 13, inward in the wheel radial direction Z (lower side of the paper sheet of FIG. 2). The recessed portion 15 is an element (bead dropping portion) configured to temporarily receive the beads 21a, 21b of the tire 20 therein in the process of attaching the tire 20 to the wheel.

The recessed portion 15 in the present embodiment is formed closer to the disc 12 than to the central portion, in the wheel width direction Y, of the main body portion 13, however, the invention is not limited thereto. The recessed portion 15 can also be formed on the opposite side of the disc 12 with the central portion inbetween.

On the main body portion 13 in the present embodiment, the first region 13a and the second region 13b are restricted side by side in the wheel width direction Y in a cross-sectional view along the wheel width direction Y.

The second region 13b is formed such as to be recessed inward in the wheel radial direction Z more than the first region 13a is, and the recessed portion 15 is formed in the second region 13b.

That is, the second region 13b is formed such that the height thereof from the outer circumferential surface 11d of the well portion 11c is smaller compared with the first region 13a. In other words, the second region 13b is formed with a smaller diameter than that of the first region 13a, with reference to the wheel rotation center (not shown).

In more detail, the second region 13b has a sleeve region 13d whose height from the outer circumferential surface 11d of the well portion 11c is lower compared with the first region 13a, and a connecting region 13c connecting the sleeve region 13d and the first region 13a. The connecting region 13c is a part of the second region 13b and is provided so as not to form a step between the first region 13a and the second region 13b.

The sleeve region 13d in the present embodiment is curved with a slight upward inclination toward the connecting region 13c, however, may be formed with a linear upward inclination. Further, the sleeve region may be horizontal without having an upward inclination.

The connecting region 13c has a larger curvature than the sleeve region 13d, having an upward inclination toward the first region 13a.

Incidentally, the boundary between the sleeve region 13d and the connecting region 13c in the present embodiment is restricted by the change between the curvature of the sleeve region 13d and the curvature of the connecting region 13c.

Incidentally, when any of the sleeve region 13d and the connecting region 13c has a linear upward inclination, the inflection point thereof is the boundary between the sleeve region 13d and the connecting region 13c.

Such a main body portion 13 has the top plate 25a, the bottom plate 25b, and a pair of side plates 25c, 25d.

The top plate 25a forms the top surface (the surface on the outer side in the wheel radial direction Z) of the main body portion 13. The top plate 25a is disposed above the bottom plate 25b, which will be described below, at a certain gap, and thereby forms a sub air chamber SC between the top plate 25a and the bottom plate 25b.

The top plate 25a is curved in a reverse S-shape, corresponding to the position where the recessed portion 15 is formed. That is, the top plate 25a is curved such that the main body portion 13 is given the first region 13a matched with the height of the standing-up portion S2, the sleeve region 13d lower than the first region 13a, and the connecting region 13c between the first region 13a and the sleeve region 13d.

Incidentally, the both end portions, in the wheel width direction Y, of the top plate 25a is curved such as to recessed inward in the wheel radial direction Z, and forms pressing portions 35a, 35b (see FIG. 5) that work when the sub air chamber member 10 is attached to the well portion 11c.

The bottom plate 25b is formed by a plate formed along the outer circumferential surface 11d of the well portion 11c. That is, the bottom plate 25b is formed such as to be flat in the wheel width direction Y, and formed such as to curve in the wheel circumferential direction X (see FIG. 1) with substantially the same curvature as the outer circumferential surface 11d. Incidentally, the width, in the wheel width direction Y, of the bottom plate 25b in the present embodiment is set such as to agree with the width, in the wheel width direction Y, of the outer circumferential surface 11d including the chambered portion at the edge portion at the both ends.

The side plate 25c and the side plate 25d are formed such as to stand up toward the outer side (the upper side of the paper sheet in FIG. 2) in the wheel radial direction Z from the respective ends, in the wheel width direction Y, of the bottom plate 25b.

More concretely, the side plate 25c stands up from one end of the bottom plate 25b of the well portion 11c and is formed along the inclined surface of the first vertical wall surface 16a.

Further, the side plate 25d stands up from the other end of the bottom plate 25b of the well portion 11c and is formed along the inclined surface of the second vertical wall surface 16b.

The upper end of the side plate 25c and the upper end of the side plate 25, both the side plates standing up from the bottom plate 25b, are joined with the respective ends, in the wheel width direction Y, of the top plate 25a.

Incidentally, as the top plate 25a has a height difference between the first region 13a and the second region 13b, the length, in the wheel radial direction Z, of the side plate 25c is smaller than the length of the side plate 25d. The length of the side plate 25c is set to be approximately half of the length of the side plate 25d in the present embodiment, however, the invention is not limited thereto.

The above-described sub air chamber SC is enclosed by the top plate 25a, the bottom plate 25b, and the pair of side plates 25c, 25d and formed inside the main body portion 13.

Figure 5:
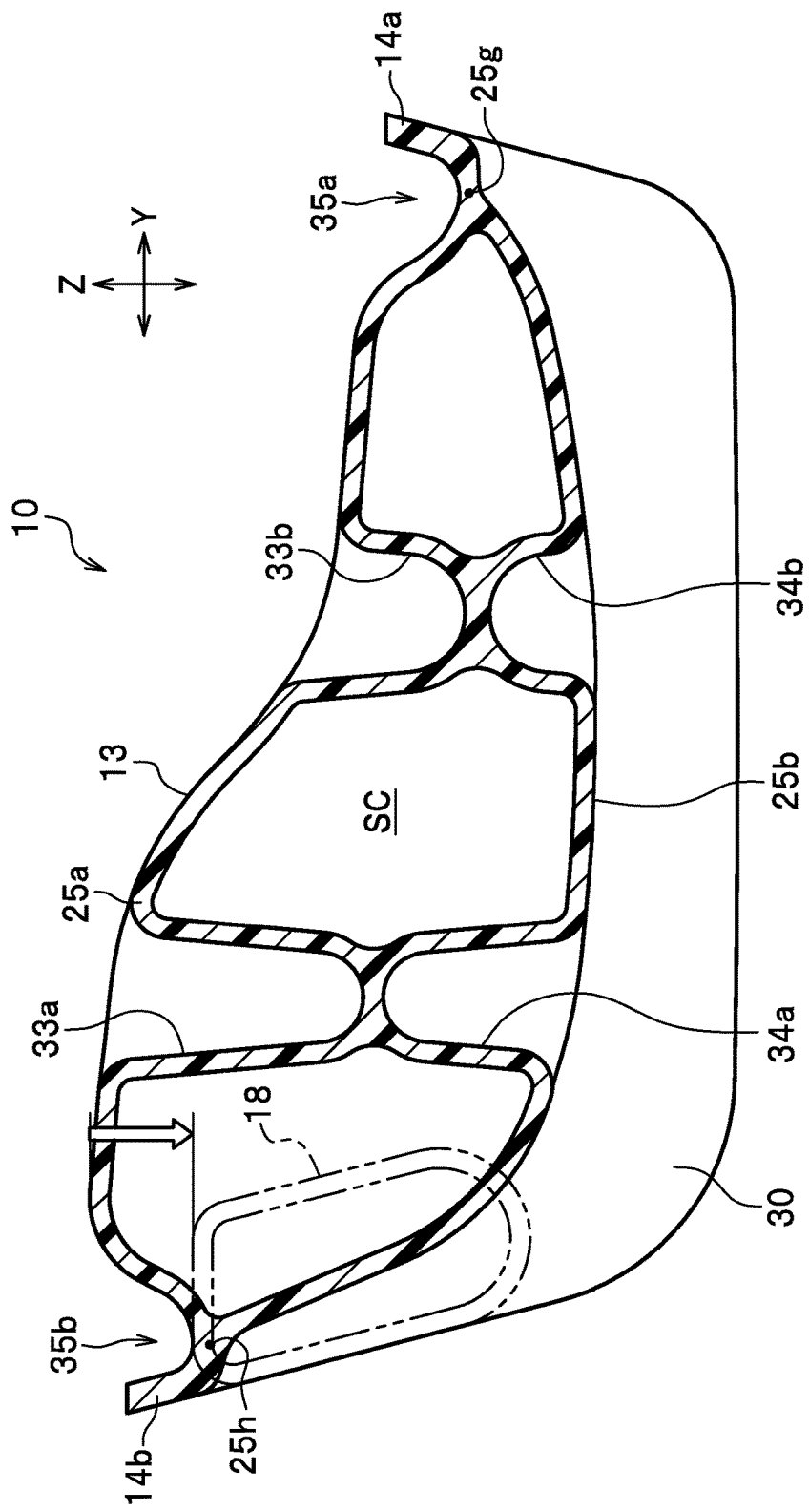
FIG. 5 is a cross-sectional view taken along V-V in FIG. 4.

FIG. 4A is a top view of the sub air chamber member 10 in FIG. 3, in a view from the outer side (the upper side of the paper sheet of FIG. 3) along the wheel radial direction Z, and FIG. 4B is a bottom view of the sub air chamber member 10 in FIG. 3, in a view from the inner side (the lower side of the paper sheet of FIG. 3) along the wheel radial direction Z. FIG. 5 is a cross-sectional view taken along V-V in FIG. 4

Incidentally, in FIG. 5, the disposition of the tube body 18 is drawn by imaginary curves.

As shown in FIG. 4A, the sub air chamber member 10 is in a long rectangular shape in a plan view. The planar shape of the main body portion 13 is a bit smaller than the planar shape of the sub air chamber member 10.

On the top surface side of the main body portion 13, formed are the first region 13a, the second region 13b, the connecting region 13c, and the sleeve region 13d, which are described above, such as to extend in the longitudinal direction.

Further, on the top surface side of the first region 13a, formed are plural upper-side joining portions 33a (in the number of eleven in the present embodiment) along the longitudinal direction. On the boundary between the connecting region 13c and the sleeve region, upper-side joining portions 33b are formed such as to straddle the connecting region 13c and the sleeve region 13d. These upper-side joining portions 33b are formed in a plurality such as to be in side-by-side relation with the above-described upper-side joining portions 33a in the wheel width direction Y. The number of the upper-side joining portions 33b in the present embodiment is eleven.

As shown in FIG. 4B, on the bottom surface side of the main body portion 13, lower-side joining portions 34a are formed at positions corresponding to the upper-side joining portions 33a (see FIG. 4A) on the top surface side of the main body portion 13.

Further, lower-side joining portions 34b are formed at positions corresponding to the upper-side joining portions 33b (see FIG. 4A). That is, the lower-side joining portions 34b are formed such as to straddle the connecting region 13c (see FIG. 4A) and the sleeve region 13d (see FIG. 4A) on the boundary between the connecting region 13c and the sleeve region 13d.

Incidentally, in FIG. 4A and FIG. 4B, symbol 18 represents the tube body 18, which will be described later in detail.

As shown in FIG. 5, the lower-side joining portions 34a, 34b are substantially in a cylindrical shape with a bottom. The upper-side joining portions 33a and the lower-side joining portion 34a are joined at the bottom portions with each other. The upper-side joining portion 33b and the lower-side joining portion 34b are also joined at the bottom portions with each other. Thus, the top plate 25a and the bottom plate 25b are integrally joined so that the sub air chamber SC is formed therein.

Incidentally, in the present embodiment, the upper-side joining portions 33a, 33b and the lower-side joining portions 34a, 34b recessed from the top plate 25a and the bottom plate 25b integrally join the top plate 25a and the bottom plate 25b. However, in the present invention, it is also possible to integrally join the top plate 25a and the bottom plate 25b by joining a joining portion (not shown), which is formed by partially recessing any one of the top plate 25a and the bottom plate 25b, with the other one of the top plate 25a and the bottom plate 25b.

As shown in FIG. 2, the bottom surface side (the inside in the wheel radial direction Z) of the main body portion 13 is provided with beads 30 that extend in a direction intersecting with the first vertical wall surface 16a and the second vertical wall surface 16b. Plural beads 30 are formed side by side along the wheel circumferential direction X.

In other words, the beads 30 are, as shown in FIG. 4B, formed in a groove shape such as to extend across the main body portion 13 in the wheel width direction Y. Plural beads 30 are formed in a direction connecting a lower-side joining portion 34a and a lower-side joining portion 34b. The number of beads 30 in the present embodiment is eleven.

Such a bead 30 is formed by partially recessing the bottom plate 25b toward the top plate 25a.

As described above, the both end portions, in the wheel width direction Y, of the main body portion 13 are provided with joint portions 25g, 25h for jointing the top plate 25a and the bottom plate 25b, which form the beads 30, so that the top plate 25a and the bottom plate 25b are integrated on a bead 50.

These both end portions are provided with the pressing portions 35a, 35b that work when the sub air chamber member 10 is pressed and attached to the well portion 11c (see FIG. 2) side.

(Tube Body)

The tube body 18 (see FIG. 3) will be described below.

Returning to FIG. 3, the tube body 18 is the end portion, in the longitudinal direction (wheel circumferential direction X), of the sub air chamber member 10, and is disposed being biased to one of the side fringe portions, in the transverse direction (wheel width direction Y), of the sub air chamber member 10. Concretely, the tube body 18 in the present embodiment is disposed closer to the fringe portion 14b, which is one of the two fringe portions 14a, 14b.

The tube body 18 is formed such as to protrude from the main body portion 13 in the longitudinal direction (wheel circumferential direction X) of the sub air chamber member 10. More concretely, as shown in FIG. 4A, the tube body 18 is provided at the end portion, in the wheel circumferential direction X, of the main body portion 13, and is formed such as to protrude in the wheel circumferential direction X from the first region 13a of the main body portion 13.

As shown in FIG. 3, the inside of the tube body 18 is provided with a communication hole 18a. The cross-sectional shape of the communication hole 18a in the present embodiment is substantially in a rectangular shape, which is longitudinal in the wheel radial direction Z. This communication hole 18a makes communication between a tire air chamber MC (see FIG. 2) and the sub air chamber SC (see FIG. 2).

In the present embodiment, as shown in FIG. 4B, the side plate 25d extends out from the main body portion 13 in the wheel circumferential direction X to form the side wall of the tube body 18.

Further, as shown in FIG. 5, the position of the outer side (the upper side of the paper sheet of FIG. 5), in the wheel radial direction Z, of the tube body 18 is shifted from the outside position, in the wheel radial direction Z, of the main body portion 13, namely from the position where the tube body 18 protrudes, toward the inner side in the wheel radial direction Z, as shown by a hollowed arrow in FIG. 5.

The length of the communication hole 18a is set such as to satisfy an expression represented by the following (Expression 1) for obtaining a resonant frequency of a Helmholtz resonator.

$$f_0 = C/2\pi \times \sqrt{(S/V(L + \cdot x\sqrt{S}))} \quad \text{(Expression 1)}$$

$f_0$ (Hz): resonant frequency
C (m/s): speed of sound inside of sub air chamber SC (=speed of sound inside of tire air chamber MC)
V (m³): volume of sub air chamber SC
L (m): length of communication hole 18a
S (m²): cross-sectional area of opening portion of communication hole 18a
·: correction coefficient Incidentally, the above-described resonant frequency $f_0$ is adjusted to the resonant frequency of the tire air chamber MC.

(Fringe Portion)

The fringe portions 14a, 14b (see FIG. 3) will be described below.

As shown in FIG. 3, the fringe portions 14a, 14b are directed in the transverse direction (the wheel width direction Y) of the sub air chamber member 10 and extended outside in the wheel radial direction Z from the main body portion 13.

In more detail description, as shown in FIG. 2, the fringe portion 14a is formed such as to extend from the joint portion 25e between the top plate 25a and the side plate 25c toward the outside (the upper side of the paper sheet of FIG. 2) in the wheel radial direction Z. The fringe portion 14a in the present embodiment is extended from the joint portion 25e along the stand-up direction of the side plate 25c.

Further, as shown in FIG. 2, the fringe portion 14b is formed such as to extend from the joint portion 25f between the top plate 25a and the side plate 25d outward (the upper side of the paper sheet of FIG. 2) in the wheel radial direction Z. The fringe portion 14b in the present embodiment is extended from the joint portion 25f along the stand-up direction of the side plate 25d.

Out of these fringe portions 14a, 14b, the position of the fringe portion 14a on the first region 13a side is shifted outward in the wheel radial direction Z compared with the position of the fringe portion 14b on the second region 13b side.

The tip end of the fringe portion 14a is fitted into the groove portion 17a, and the tip end of the fringe portion 14b is fitted into the groove portion 17b. Thus, the sub air chamber member 10 is attached onto the well portion 11c of the rim 11.

Incidentally, the extending direction of the fringe portions 14a, 14b is desired to agree with the stand-up directions of the fringe portions 14a, 14b, however, as long as the fringe portions 14a, 14b are extended along the stand-up direction of the side plates 25c, 25d, a little deviation in the extending direction is permitted.

The thicknesses of the fringe portions 14a, 14b in the present embodiment are set to be substantially the same as those of the bottom plate 25b, and the side plates 25c, 25d. These fringe portions 14a, 14b have spring elasticity by appropriate selection of thicknesses and material thereof.

The sub air chamber member 10 in the above-described present embodiment is assumed to be a resin product, however, the material of the sub air chamber member 10 is not limited thereto, and the sub air chamber member 10 can also be formed from other materials such as metal. Incidentally, in a case of a resin product, a resin of light weight and high stiffness which allows blow forming is desirable, in consideration of reduction in weight, improvement of mass-productivity, reduction in manufacturing cost, ensured air sealing of the sub air chamber SC, and the like. Above all, polypropylene, which is resistant against repeated bending fatigue, is particularly desirable.

<Method of Attaching Sub Air Chamber Member>

Figure 6A:
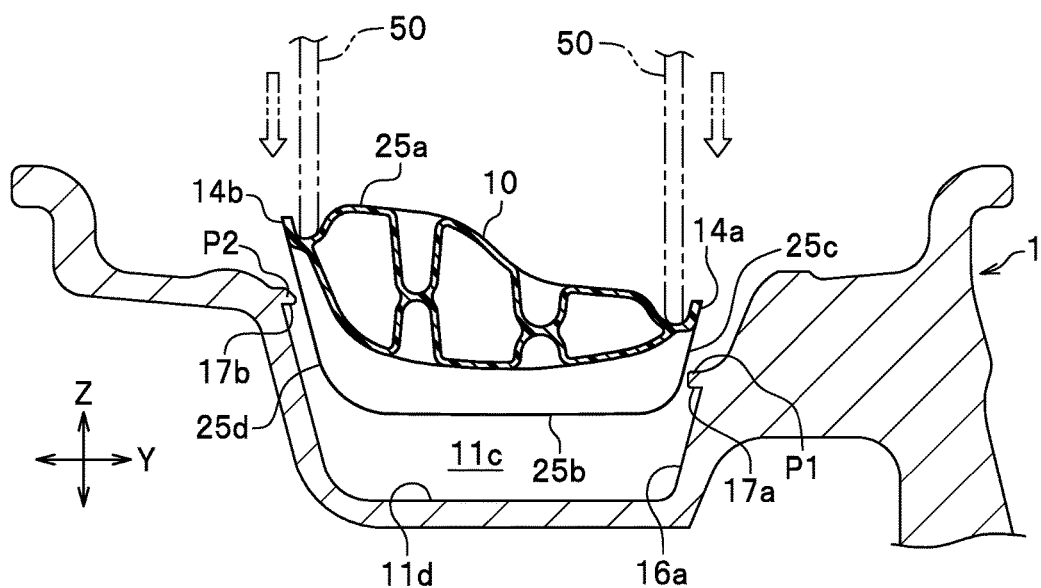
FIGS. 6A and 6B are process illustrations for illustrating an attaching method of the sub air chamber member to the well portion of a rim.
Figure 6B:
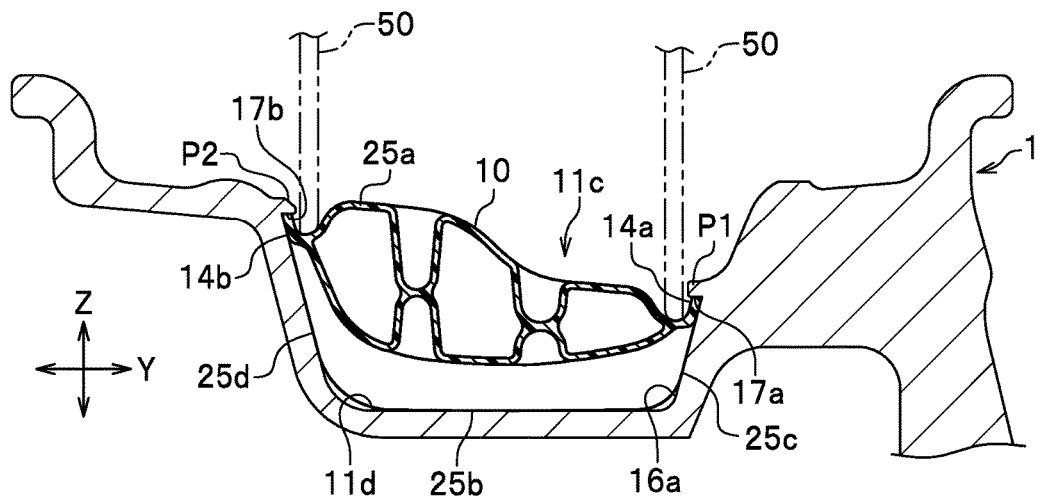

A method of attaching the sub air chamber member 10 to the well portion 11c will be described below. FIGS. 6A and 6B are process illustrations for illustrating a method of attaching the sub air chamber member 10 to the well portion 11c.

For attaching the sub air chamber member 10 to the well portion 11c in the present embodiment, it is assumed to use a pair of pushers (pressing devices) 50 (see FIGS. 6A and 6B) for pressing the sub air chamber member 10 toward the outer circumferential surface 11d of the well portion 11c.

As these pushers 50, for example, one that generates a pressure force by the air pressure of an air cylinder can be considered.

Incidentally, in FIGS. 6A and 6B, the pushers 50 are shown by virtual lines (alternate long and two short dashes lines) for the convenience of drawing.

The pushers 50 used in the present embodiment can be, for example, a plate shaped member provided with an edge portion having an outline in an arc shape with a curvature, in the longitudinal direction (the wheel circumferential direction X in FIG. 3), of the sub air chamber member 10, however, pushers 50 applicable to the present invention are not limited thereto and can be changed in designing, as appropriate.

In this attaching method, as shown in FIG. 6A, first, the sub air chamber member 10 is disposed on the well portion 11c. Then, the pair of pushers 50, 50 are respectively pressed against the portions, close to the fringe portions 14a, 14b, of the top plate 25a, concretely, pressing portions 35a, 35b (See FIG. 5), wherein loads are applied in the direction of the hollowed arrows.

Accompanying the approach thereby of the sub air chamber member 10 to the outer circumferential surface 11d of the well portion 11c, the fringe portions 14a, 14b are, though not shown, displaced toward the wheel inner side in the wheel width direction Y by reaction forces applied by the protruding portions P1, P2 (see FIGS. 6A and 6B).

Then, as shown in FIG. 6B, the pushers 50, 50 press the top plate 25a so that the bottom plate 25b is disposed along the outer circumferential surface 11d of the well portion 11c. Then, the fringe portions 14a, 14b are restored by the elastic force thereof so that the tip ends thereof respectively fitted into the groove portions 17a, 17b. Thus, the sub air chamber member 10 is attached onto the outer circumferential surface 11d of the well portion 11c, and a series of processes of this attaching method is completed.

Incidentally, in the present embodiment, as described above, it is assumed that the both end portions of the main body portion 13 are pressed by the pusher 50 (see FIGS. 6A and 6B), however, the invention is not limited thereto.

For example, it is also possible to incline the sub air chamber member 10 to fit the fringe portion 14a into the groove portion 17a in advance, and thereafter press the pressing portion 35b (see FIG. 5) by the pusher 50 so that the fringe portion 14b is fitted into the groove portion 17b. Further, is also possible to fit the fringe portion 14b into the groove portion 17a in advance, and thereafter press the pressing portion 35a by the pusher 50 so that the fringe portion 14a is fitted into the groove portion 17a.

With the vehicle wheel 1 applied in an attaching method in which only one of the pressing portion 35a, 35b is pressed in such a manner so that the sub air chamber member 10 is attached to the well portion 11c, it is not necessary to provide two pressing portions 35a, 35b, and a structure is also possible in which either one of the pressing portion 35a and the pressing portion 35b is provided.

The actions and advantages by the vehicle wheel 1 in the present embodiment will be described below.

For the vehicle wheel 1, as the sub air chamber member 10 is attached to the standing-up portions S1, S2 of the rim 11 forming the well portion 11c, it is unnecessary to provide a standing vertical wall to the outer circumferential surface 11d of the well portion 11c, making a difference from a conventional vehicle wheel (for example, refer to Patent Document 1). Accordingly, the vehicle wheel 1 in the present embodiment has a simple structure in which a vertical wall is omitted.

Further, by omitting the vertical wall, the vehicle wheel 1 ensures the disposition space of the sub air chamber member 10 on the outer circumferential surface 11d of the well portion 11c to be larger compared with a conventional vehicle wheel (for example, refer to Patent Document 1). Accordingly, by the vehicle wheel 1 in the present embodiment, the sub air chamber SC formed in the sub air chamber member 10 (main body portion 13) can be made large.

Further, as shown in FIG. 2, in the vehicle wheel 1, the main body portion 13 of the sub air chamber member 10 has the recessed portion 15 (see FIG. 2) into which the beads 21a, 21b of the tire 20 are dropped in attaching the tire 20 to a part of the region on the outer side in the wheel radial direction Z. Accordingly, by the vehicle wheel 1, while maintaining the easiness of attaching the tire 20, the sub air chamber SC formed in the sub air chamber member 10 (main body portion 13) can be made large.

Further, in the vehicle wheel 1, the upper-side joining portions 33a, 33b and the lower-side joining portions 34a, 34b are joined with each other in the sub air chamber SC so that the top plate 25a and the bottom plate 25b are integrated with each other. Accordingly, the mechanical strength of the sub air chamber member 10 is further improved.

Further, by the vehicle wheel 1, the upper-side joining portions 33a, 33b and the lower-side joining portions 34a, 34b are joined to restrict the variation of the volume of the sub air chamber SC. Accordingly, it is possible to attain a silencing function further effectively.

Still further, different from a conventional vehicle wheel (for example, refer to Patent Document 1), the main body portion 13 of the vehicle wheel 1 is provided with the side plates 25c, 25b in addition to the top plate 25a and the bottom plate 25b. The fringe portions 14a, 14b extend from the joint portions 25e, 25f which are between the side plates 25c, 25d and the top plate 25a, the joint portions 25e, 25f standing up from the both ends of the bottom plate 25b. Accordingly, by the vehicle wheel 1, even when the main body portion 13 is enlarged being matched with the well portion 11c enlarged to the inner side in the wheel radial direction Z, the positions of the fringe portions 14a, 14b in the wheel radial direction Z are shifted by the side plates 25c, 25d toward the outer side in the wheel radial direction Z.

By the vehicle wheel 1 as described above, in fitting the fringe portions 14a, 14b into the groove portions 17a, 17b by pressing the top plate 25a with the pushers 50, the distance of moving the fringe portions 14a, 14b to the groove portions 17a, 17b (see FIGS. 6A and 6B), while applying loads to the fringe portions 14a, 14b, becomes short. Thus, attaching work of the sub air chamber member 10 by the pushers 50 becomes easy.

Further, different from a conventional vehicle wheel (for example, refer to Patent Document 1), for the vehicle wheel 1, the two groove portions 17a, 17b are respectively formed at the two standing-up portions S1, S2 (see FIG. 2) of the well portion 11c. Accordingly, even when the well portion 11c is enlarged to the inside in the wheel radial direction Z, the heights of the standing-up portions S1, S2 of the well portion 11c naturally become high.

Thus, unlike a conventional vehicle wheel (for example, refer to Patent Document 1), for the vehicle wheel 1 according to the present invention, even without making a significant change of design such as changing the height of the vertical wall, it is possible to make the volume of the sub air chamber SC large by enlarging the well portion 11c inward in the wheel radial direction Z.

In other words, it is possible to make the volume of the sub air chamber SC large even if the wheel width is small. This reduces the weight of the wheel to attain an excellent fuel efficiency and enables providing a vehicle wheel 1 also excellent in the silencing performance.

Further, in the vehicle wheel 1 as described above, the pair of side plates 25c, 25d of the sub air chamber member 10 respectively stand up outward in the wheel radial direction Z from the both ends, in the wheel width direction Y, of the bottom plate 25b along the standing-up portions S1, S2 corresponding to the side plates 25c, 25d. Thus, the vehicle wheel 1 can utilize, to the maximum, the housing space for the sub air chamber member 10 formed between the two standing-up portions S1, S2 of the well portion 11c, and ensure the volume of the sub air chamber SC to be larger.

In the above-described vehicle wheel 1, the respective fringe portions 14a, 14b of the sub air chamber member 10 extend out from the main body portion 13, along the respective standing-up directions of the side plates 25c, 25d.

By the vehicle wheel 1, the fringe portions 14a, 14b as well as the side plates 25c, 25d can be disposed along the standing-up portions S1, S2 of the well portion 11c, which enables utilizing the housing space for the sub air chamber member 10 further efficiently.

Further, as described above, when the pushers 50 are pressed against the top plate 25a and loads are applied in the direction of the hollowed arrow, the fringe portions 14a, 14b are displaced in the wheel width direction Y (warped) to be fitted into the groove portions 17a, 17b. Accordingly, in comparison with a vehicle wheel whose fringe portions warp in the wheel radial direction Z, such as a conventional vehicle wheel (for example, refer to Patent Document 1), the vehicle wheel 1 allows the fringe portions 14a, 14b to warp by light loads, and it is thereby possible to attach the sub air chamber member 10 to the outer circumferential surface 11d of the well portion 11c by light loads.

Still further, on the vehicle wheel 1, the side plates 25c, 25d of the main body portion 13 are respectively disposed along the first vertical wall surface 16a and the second vertical wall surface 16b restricted by the two standing-up portions S1, S2 of the well portion 11c. Accordingly, in disposing the sub air chamber member 10 to the outer circumferential surface 11d of the well portion 11c, the both side plates 25c, 25d of the main body portion 13 do not interfere with the first vertical wall surface 16a or the second vertical wall surface 16b, and the fringe portions 14a, 14b are inserted into the groove portions 17a, 17b. Accordingly, by the vehicle wheel 1, the load applied to the sub air chamber member 10 can be further decreased in attaching the sub air chamber member 10 to the outer circumferential surface 11d of the well portion 11c.

Thus, the production efficiency of the vehicle wheel 1 can be further improved.

Further, in the vehicle wheel 1 described above, the first vertical wall surface 16a and the second vertical wall surface 16b are respectively provided with protruding portions P1, P2 protruding inward, in the wheel width direction Y, of the wheel. The pair of groove portions 17a, 17b are formed in the respective inner sides, in the wheel radial direction Z, of the protruding portions P1, P2 and between the protruding portions P1, P2 and first vertical wall surface 16a and the second vertical wall surface 16b. The respective tip ends of the fringe portions 14a, 14b are fitted into the pair of groove portions 17a, 17b.

By the vehicle wheel 1, as the tip ends of the fringe portions 14a, 14b are fitted into the groove portions 17a, 17b such as to be pressed against the inner sides, in the wheel radial direction Z, of the protruding portions P1, P2, the main body portion 13 of the sub air chamber member 10 can be firmly supported at the well portion 11c through the fringe portions 14a, 14b even when a centrifugal force is applied to the sub air chamber member 10 by rotation of the vehicle wheel 1.

Further, for the vehicle wheel 1, as the sub air chamber member 10 are attached to the standing-up portions S1, S2 of the rim 11 forming the well portion 11c, it is unnecessary to arrange a vertical wall standing up from the outer circumferential surface 11d of the well portion 11c, differently from a conventional vehicle wheel (for example, refer to Patent Document 1). Accordingly, the vehicle wheel 1 in the present embodiment can have a simple structure in which a vertical wall is omitted.

The present embodiment has been described above, however, the present invention is not limited to the above-described embodiment and can be carried out in various embodiments.

In the above-described embodiment, in attaching the sub air chamber member 10 to the well portion 11c, the pair of pushers 50, 50 are used to fit the fringe portions 14a, 14b into the groove portions 17a, 17b in one process, however, according to the invention, it is also possible to first fit the fringe portion 14a into the groove portion 17a by inclining the sub air chamber member 10, and then fit the fringe portion 14b into the groove portion 17b, and it is also possible to first fit the fringe portion 14b into the groove portion 17b, and then fit the fringe portion 14a into the groove portion 17a.

In the above-described embodiment, the cross-sectional shape of the communication hole 18a is substantially in a longitudinal rectangular shape, however, the cross-sectional shape of the communication hole 18a can be formed also in a longitudinal ellipse shape or a longitudinal polygonal shape. Further, the cross-sectional shape of the communication hole 18a may be not longitudinal.

Further, in the above-described embodiment, it is assumed that four sub air chamber members 10 are provided, however, according to the invention, two, three, or more than four sub air chamber members 10 may be provided at equal intervals in the wheel circumferential direction.

Further, in the above-described embodiment, the recessed portion 15 is formed by recessing a region on the side closer to the disc 12 than the central portion, in the wheel width direction Y, of the main body portion 13, however, the central portion in the wheel width direction Y may be recessed to form the recessed portion 15. Further, the recessed portion 15 may be formed by recessing a region on the side, in the wheel width direction Y, opposite to the disc 12 with respect to the central portion.

DESCRIPTION OF REFERENCE SYMBOLS

1 . . . vehicle wheel
10 . . . sub air chamber member
11 . . . rim
11a . . . bead sheet
11c . . . well portion
11d . . . outer circumferential surface
12 . . . disc
13 . . . main body portion
13a . . . first region
13b . . . second region
13c . . . connecting region
13d . . . sleeve region
14a . . . fringe portion
14b . . . fringe portion
15 . . . recessed portion
16a . . . first vertical wall surface
16b . . . second vertical wall surface
17a . . . groove portion
17b, groove portion
18a . . . communication hole
25a . . . top plate
25b . . . bottom plate
25c . . . side plate
25d . . . side plate
30 . . . bead
33a . . . upper-side joining portion
33b . . . upper-side joining portion
34a . . . lower-side joining portion
34b . . . lower-side joining portion
X . . . wheel circumferential direction
Y . . . wheel width direction
Z . . . wheel radial direction
SC . . . sub air chamber
MC . . . tire air chamber
S1 . . . standing-up portion
S2 . . . standing-up portion

The invention claimed is:

1. A vehicle wheel in which a plurality of sub air chamber members, configured as Helmholtz resonators, are attached to an outer circumferential surface of a well portion, said vehicle wheel comprising:
   a first substantially vertical wall surface restricted by a first one of a pair of standing-up portions of a rim forming the well portion; and
   a second substantially vertical wall surface restricted by a second one of the standing-up portions of the rim forming the well portion,
   wherein each sub air chamber member includes:
   a main body portion having a sub air chamber formed therein which is defined by a space enclosed by a top plate, a bottom plate and a pair of side plates, the pair of side plates extending upwardly from opposite sides of the bottom plate, in a wheel width direction, and extending outward from the bottom plate substantially in a wheel radial direction; and
   fringe portions extending from both side plates, respectively, in the wheel width direction, of the main body portion,
   and wherein the fringe portions of the sub air chamber member are respectively fitted into groove portions formed respectively on the first vertical wall surface and the second vertical wall surface, so that the sub air chamber member is attached to the outer circumferential surface of the well portion, and
   the pair of side plates are formed to extend along the first vertical wall surface and the second vertical wall surface, respectively.

2. The vehicle wheel according to claim 1, wherein the main body portion of each sub air chamber member includes a recessed portion defined in a partial region on an outer side of the main body portion in the wheel radial direction, the recessed portion configured to temporarily receive a bead of a tire therein when the tire is attached to the wheel.

3. The vehicle wheel according to claim 1, wherein a cross-sectional shape of the side plates and the bottom plate substantially conform to a cross-sectional shape of the well portion which supportively contacts the side plates and the bottom plate.

4. The vehicle wheel according to claim 2, wherein a cross-sectional shape of the side plates and the bottom plate substantially conform to a cross-sectional shape of the well portion which supportively contacts the side plates and the bottom plate.

* * * * *